United States Patent
Krekel et al.

(10) Patent No.: US 10,967,851 B2
(45) Date of Patent: Apr. 6, 2021

(54) VEHICLE SYSTEM AND METHOD FOR SETTING VARIABLE VIRTUAL BOUNDARY

(71) Applicant: Ford Global Technologies, LLC, Dearborn, MI (US)

(72) Inventors: Markus Krekel, Wermelskirchen (DE); Ahmed Benmimoun, Aachen (DE); Andrew Ochmanski, Royal Oak, MI (US); Thomas Gerlitz, Aachen (DE); Nadja Wysietzki, Cologne (DE); Cinderella Matuk, Cologne (DE); Li Xu, Northville, MI (US); Kyle Simmons, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 16/139,470

(22) Filed: Sep. 24, 2018

(65) Prior Publication Data
US 2020/0094816 A1 Mar. 26, 2020

(51) Int. Cl.
*B60W 30/06* (2006.01)
*G08G 1/14* (2006.01)
(Continued)

(52) U.S. Cl.
CPC .......... *B60W 30/06* (2013.01); *G05D 1/0088* (2013.01); *G06K 9/00798* (2013.01); *G06K 9/00812* (2013.01); *G06T 7/62* (2017.01); *G08G 1/143* (2013.01); *G05D 2201/0213* (2013.01); *G06T 2207/30256* (2013.01); *G06T 2207/30264* (2013.01)

(58) Field of Classification Search
CPC .................... B60W 30/06; G06T 7/62; G06T 2207/30256; G06T 2207/30264; G05D 1/0088; G05D 2201/0213; G06K 9/00798; G06K 9/00812; G08G 1/143
See application file for complete search history.

(56) References Cited

U.S. PATENT DOCUMENTS 5,959,724 A 9/1999 Izumi
6,275,754 B1 8/2001 Shimizu
(Continued)

FOREIGN PATENT DOCUMENTS

CN 101929921 A 12/2010
CN 103818204 A 5/2014
(Continued)

OTHER PUBLICATIONS

US 9,772,406 B2, 09/2017, Liu (withdrawn)
(Continued)

*Primary Examiner* — Navid Ziaeianmehdizadeh
*Assistant Examiner* — Sean P Quinn
(74) *Attorney, Agent, or Firm* — Frank Lollo; Eversheds Sutherland (US) LLP

(57) ABSTRACT

A vehicle system includes a camera, a sensor, and processors for detecting an unoccupied parking spot while the vehicle traverses a detection path. The processors define a variable virtual boundary based on at least one object detected on a side of the detection path excluding the unoccupied parking spot and generates at least one parking maneuver based on the unoccupied parking spot and the variable virtual boundary.

19 Claims, 6 Drawing Sheets

(51) Int. Cl.
  *G05D 1/00* (2006.01)
  *G06T 7/62* (2017.01)
  *G06K 9/00* (2006.01)

(56) References Cited

U.S. PATENT DOCUMENTS

| | | |
|---|---|---|
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B2 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0100614 A1* | 5/2008 | Augst .................. G06T 19/006 345/419 |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2008/0306691 A1* | 12/2008 | Louis .................. G08G 5/0021 701/301 |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |

(56) References Cited

U.S. PATENT DOCUMENTS

| | | | |
|---|---|---|---|
| 2009/0125311 A1 | 5/2009 | Haulick | |
| 2009/0128315 A1 | 5/2009 | Griesser | |
| 2009/0146813 A1 | 6/2009 | Nuno | |
| 2009/0174574 A1 | 7/2009 | Endo | |
| 2009/0241031 A1 | 9/2009 | Gamaley | |
| 2009/0289813 A1 | 11/2009 | Kwiecinski | |
| 2009/0309970 A1 | 12/2009 | Ishii | |
| 2009/0313095 A1 | 12/2009 | Hurpin | |
| 2010/0025942 A1 | 2/2010 | Mangaroo | |
| 2010/0061564 A1 | 3/2010 | Clemow | |
| 2010/0114471 A1 | 5/2010 | Sugiyama | |
| 2010/0114488 A1 | 5/2010 | Khamharn | |
| 2010/0136944 A1 | 6/2010 | Taylor | |
| 2010/0152972 A1 | 6/2010 | Attard | |
| 2010/0156672 A1 | 6/2010 | Yoo | |
| 2010/0245277 A1 | 9/2010 | Nakao | |
| 2010/0259420 A1 | 10/2010 | Von Rehyer | |
| 2011/0071725 A1 | 3/2011 | Kleve | |
| 2011/0082613 A1 | 4/2011 | Oetiker | |
| 2011/0190972 A1 | 8/2011 | Timmons | |
| 2011/0205088 A1 | 8/2011 | Baker | |
| 2011/0253463 A1 | 10/2011 | Smith | |
| 2011/0309922 A1 | 12/2011 | Ghabra | |
| 2012/0007741 A1 | 1/2012 | Laffey | |
| 2012/0072067 A1 | 3/2012 | Jecker | |
| 2012/0083960 A1 | 4/2012 | Zhu | |
| 2012/0173080 A1 | 7/2012 | Cluff | |
| 2012/0176332 A1 | 7/2012 | Fujibayashi | |
| 2012/0271500 A1 | 10/2012 | Tsimhoni | |
| 2012/0303258 A1 | 11/2012 | Pampus | |
| 2012/0323643 A1 | 12/2012 | Volz | |
| 2012/0323700 A1 | 12/2012 | Aleksandrovich | |
| 2013/0021171 A1 | 1/2013 | Hsu | |
| 2013/0024202 A1 | 1/2013 | Harris | |
| 2013/0043989 A1 | 2/2013 | Niemz | |
| 2013/0073119 A1 | 3/2013 | Huger | |
| 2013/0096765 A1* | 4/2013 | Jun | G01S 15/931 701/23 |
| 2013/0109342 A1 | 5/2013 | Welch | |
| 2013/0110342 A1 | 5/2013 | Wuttke | |
| 2013/0113936 A1 | 5/2013 | Cohen | |
| 2013/0124061 A1 | 5/2013 | Khanafer | |
| 2013/0145441 A1 | 6/2013 | Mujumdar | |
| 2013/0211623 A1 | 8/2013 | Thompson | |
| 2013/0231824 A1 | 9/2013 | Wilson | |
| 2013/0289825 A1 | 10/2013 | Noh | |
| 2013/0314502 A1 | 11/2013 | Urbach | |
| 2013/0317944 A1 | 11/2013 | Huang | |
| 2014/0052323 A1 | 2/2014 | Reichel | |
| 2014/0095994 A1 | 4/2014 | Kim | |
| 2014/0096051 A1 | 4/2014 | Boblett | |
| 2014/0121930 A1 | 5/2014 | Allexi | |
| 2014/0147032 A1 | 5/2014 | Yous | |
| 2014/0156107 A1 | 6/2014 | Karasawa | |
| 2014/0188339 A1 | 7/2014 | Moon | |
| 2014/0222252 A1 | 8/2014 | Matters | |
| 2014/0240502 A1 | 8/2014 | Strauss | |
| 2014/0282931 A1 | 9/2014 | Protopapas | |
| 2014/0297120 A1 | 10/2014 | Cotgrove | |
| 2014/0300504 A1 | 10/2014 | Shaffer | |
| 2014/0303839 A1 | 10/2014 | Filev | |
| 2014/0320318 A1 | 10/2014 | Victor | |
| 2014/0327736 A1 | 11/2014 | DeJohn | |
| 2014/0350804 A1 | 11/2014 | Park | |
| 2014/0350855 A1 | 11/2014 | Vishnuvajhala | |
| 2014/0365108 A1 | 12/2014 | You | |
| 2014/0365126 A1 | 12/2014 | Vulcano | |
| 2015/0022468 A1 | 1/2015 | Cha | |
| 2015/0039173 A1 | 2/2015 | Beaurepaire | |
| 2015/0039224 A1 | 2/2015 | Tuukkanen | |
| 2015/0048927 A1 | 2/2015 | Simmons | |
| 2015/0066545 A1 | 3/2015 | Kotecha | |
| 2015/0077522 A1 | 3/2015 | Suzuki | |
| 2015/0088360 A1 | 3/2015 | Bonnet | |
| 2015/0091741 A1 | 4/2015 | Stefik | |
| 2015/0109116 A1 | 4/2015 | Grimm | |
| 2015/0116079 A1 | 4/2015 | Mishra | |
| 2015/0123818 A1 | 5/2015 | Sellschopp | |
| 2015/0127208 A1 | 5/2015 | Jecker | |
| 2015/0149265 A1 | 5/2015 | Huntzicker | |
| 2015/0151789 A1 | 6/2015 | Lee | |
| 2015/0153178 A1 | 6/2015 | Koo | |
| 2015/0161890 A1 | 6/2015 | Huntzicker | |
| 2015/0163649 A1 | 6/2015 | Chen | |
| 2015/0179075 A1* | 6/2015 | Lee | G08G 1/165 340/932.2 |
| 2015/0197278 A1 | 7/2015 | Boos | |
| 2015/0203111 A1 | 7/2015 | Bonnet | |
| 2015/0203156 A1 | 7/2015 | Hafner | |
| 2015/0210317 A1 | 7/2015 | Hafner | |
| 2015/0217693 A1 | 8/2015 | Pliefke | |
| 2015/0219464 A1 | 8/2015 | Beaurepaire | |
| 2015/0220791 A1 | 8/2015 | Wu | |
| 2015/0226146 A1 | 8/2015 | Elwart | |
| 2015/0274016 A1 | 10/2015 | Kinoshita | |
| 2015/0286340 A1 | 10/2015 | Send | |
| 2015/0329110 A1 | 11/2015 | Stefan | |
| 2015/0344028 A1 | 12/2015 | Gieseke | |
| 2015/0346727 A1 | 12/2015 | Ramanujam | |
| 2015/0360720 A1 | 12/2015 | Li | |
| 2015/0365401 A1 | 12/2015 | Brown | |
| 2015/0371541 A1 | 12/2015 | Korman | |
| 2015/0375741 A1 | 12/2015 | Kiriya | |
| 2015/0375742 A1 | 12/2015 | Gebert | |
| 2016/0012653 A1 | 1/2016 | Soroka | |
| 2016/0012726 A1 | 1/2016 | Wang | |
| 2016/0018821 A1 | 1/2016 | Akita | |
| 2016/0055749 A1 | 2/2016 | Nicoll | |
| 2016/0153778 A1 | 2/2016 | Singh | |
| 2016/0062354 A1 | 3/2016 | Li | |
| 2016/0068158 A1 | 3/2016 | Elwart | |
| 2016/0068187 A1 | 3/2016 | Hata | |
| 2016/0075369 A1 | 3/2016 | Lavoie | |
| 2016/0090055 A1 | 3/2016 | Breed | |
| 2016/0107689 A1 | 4/2016 | Lee | |
| 2016/0112846 A1 | 4/2016 | Siswick | |
| 2016/0114726 A1 | 4/2016 | Nagata | |
| 2016/0117926 A1 | 4/2016 | Akavaram | |
| 2016/0127664 A1 | 5/2016 | Bruder | |
| 2016/0139244 A1 | 5/2016 | Holtman | |
| 2016/0144857 A1 | 5/2016 | Ohshima | |
| 2016/0152263 A1 | 6/2016 | Singh | |
| 2016/0170494 A1 | 6/2016 | Bonnet | |
| 2016/0185389 A1 | 6/2016 | Ishijima | |
| 2016/0189435 A1 | 6/2016 | Beaurepaire | |
| 2016/0207528 A1 | 7/2016 | Stefan | |
| 2016/0224025 A1 | 8/2016 | Petel | |
| 2016/0229452 A1 | 8/2016 | Lavoie | |
| 2016/0236680 A1 | 8/2016 | Lavoie | |
| 2016/0249294 A1 | 8/2016 | Lee | |
| 2016/0257304 A1 | 9/2016 | Lavoie | |
| 2016/0272244 A1 | 9/2016 | Imai | |
| 2016/0282442 A1 | 9/2016 | O'Mahony | |
| 2016/0284217 A1 | 9/2016 | Lee | |
| 2016/0288657 A1 | 10/2016 | Tokura | |
| 2016/0300417 A1 | 10/2016 | Hatton | |
| 2016/0304087 A1 | 10/2016 | Noh | |
| 2016/0304088 A1 | 10/2016 | Barth | |
| 2016/0349362 A1 | 10/2016 | Rohr | |
| 2016/0321445 A1 | 11/2016 | Turgeman | |
| 2016/0321926 A1 | 11/2016 | Mayer | |
| 2016/0334797 A1 | 11/2016 | Ross | |
| 2016/0347280 A1 | 12/2016 | Daman | |
| 2016/0355125 A1 | 12/2016 | Herbert | |
| 2016/0357354 A1 | 12/2016 | Chen | |
| 2016/0358474 A1 | 12/2016 | Uppal | |
| 2016/0368489 A1 | 12/2016 | Aich | |
| 2016/0371607 A1 | 12/2016 | Rosen | |
| 2016/0371691 A1 | 12/2016 | Kang | |
| 2017/0001650 A1 | 1/2017 | Park | |
| 2017/0008563 A1 | 1/2017 | Popken | |
| 2017/0026198 A1 | 1/2017 | Ochiai | |
| 2017/0028985 A1 | 2/2017 | Kiyokawa | |
| 2017/0030722 A1 | 2/2017 | Kojo | |

(56) References Cited

U.S. PATENT DOCUMENTS

| | | |
|---|---|---|
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0096167 A1* | 4/2017 | Yoon ................ B62D 15/0285 |
| 2017/0097504 A1 | 4/2017 | Takamatsu |
| 2017/0116790 A1 | 4/2017 | Kusens |
| 2017/0123423 A1 | 5/2017 | Sako |
| 2017/0129486 A1* | 5/2017 | Nakada ................ B60W 10/20 |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0197550 A1* | 7/2017 | Navarro Zavala ......... B60J 1/00 |
| 2017/0200369 A1 | 7/2017 | Miller |
| 2017/0203763 A1 | 7/2017 | Yamada |
| 2017/0208438 A1 | 7/2017 | Dickow |
| 2017/0261327 A1* | 9/2017 | Olsson ............... G06K 9/00798 |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0099661 A1* | 4/2018 | Bae ........................ G08G 1/146 |
| 2018/0105165 A1 | 4/2018 | Alarcon et al. |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0246515 A1* | 8/2018 | Iwama ................. B60W 30/06 |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0092317 A1* | 3/2019 | Bonander .......... B62D 15/0285 |
| 2019/0094871 A1* | 3/2019 | Sugano ................ G05D 1/0214 |
| 2019/0103027 A1 | 4/2019 | Wheeler |
| 2019/0130747 A1* | 5/2019 | Kurotobi ............. B60W 30/06 |
| 2019/0137990 A1 | 5/2019 | Golgiri |
| 2019/0302800 A1* | 10/2019 | Martens ............... G05D 1/0289 |
| 2020/0079361 A1* | 3/2020 | Suzuki ................. G05D 1/0223 |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102009024083 A1 | 12/2010 |
| DE | 102016224529 A1 | 3/2011 |
| DE | 102016226008 A1 | 3/2011 |
| DE | 102009060169 A1 | 6/2011 |
| DE | 102011080148 A1 | 1/2013 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102010034129 B4 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 A | 9/2013 |
| KR | 20090040024 A | 4/2016 |
| KR | 20100006714 A | 5/2016 |
| WO | WO 2006/064544 A1 | 11/2011 |
| WO | WO 2008/055567 A1 | 4/2013 |
| WO | WO 2010/006981 A1 | 8/2013 |

(56) References Cited

FOREIGN PATENT DOCUMENTS

| WO | WO 2011/141096 A1 | 7/2014 |
|----|-------------------|--------|
| WO | WO 2013/056959 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |
| WO | WO 2017/097942 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.
Al-Sherbaz, Ali et al., Hybridisation of GNSS with other wireless/sensors technologies on board smartphones to offer seamless outdoors-indoors positioning for LBS applications, Apr. 2016, 3 pages.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Land Rover, Land Rover Remote Control Via IPhone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.

* cited by examiner

VEHICLE SYSTEM AND METHOD FOR SETTING VARIABLE VIRTUAL BOUNDARY

TECHNICAL FIELD

The present disclosure generally relates to a vehicle system and method for autonomous parking and, more specifically, a vehicle system and method for setting variable virtual boundary for generating at least one parking maneuver.

BACKGROUND

Today, many vehicles include a feature for autonomously parking a vehicle into an unoccupied parking spot. To move the vehicle to the unoccupied parking spot, the vehicle first determines its environment. Subsequently, the vehicle determines one or more parking maneuvers for moving the vehicle to the unoccupied parking spot. To determine the one or more parking maneuvers, the vehicles must consider any boundaries proximate to the unoccupied parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Vehicle systems and method are disclosed for autonomously parking a vehicle.

An example vehicle system includes a camera, a sensor, and processors. The processors detect an unoccupied parking spot while the vehicle traverses a detection path. The processors define a variable virtual boundary based on at least one object or characteristic detected on a side of the detection path excluding the unoccupied parking spot. Further, the processors generate at least one parking maneuver based on the unoccupied parking spot and the variable virtual boundary.

Another example vehicle system includes a camera, a sensor, and processors. The processors detect an unoccupied parking spot while the vehicle traverses a detection path. The processors define a variable virtual boundary based on a side of the detection path excluding the unoccupied parking spot. Further, the processors generate at least one parking maneuver based on the unoccupied parking spot and the variable virtual boundary.

An example method of autonomously parking a vehicle includes detecting, via at least one camera and sensor, an unoccupied parking spot while the vehicle traverses a detection path, defining a variable virtual boundary based on at least one object detected on a side of the detection path excluding the unoccupied parking spot, and generating at least one parking maneuver based on the unoccupied parking spot and the variable virtual boundary.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
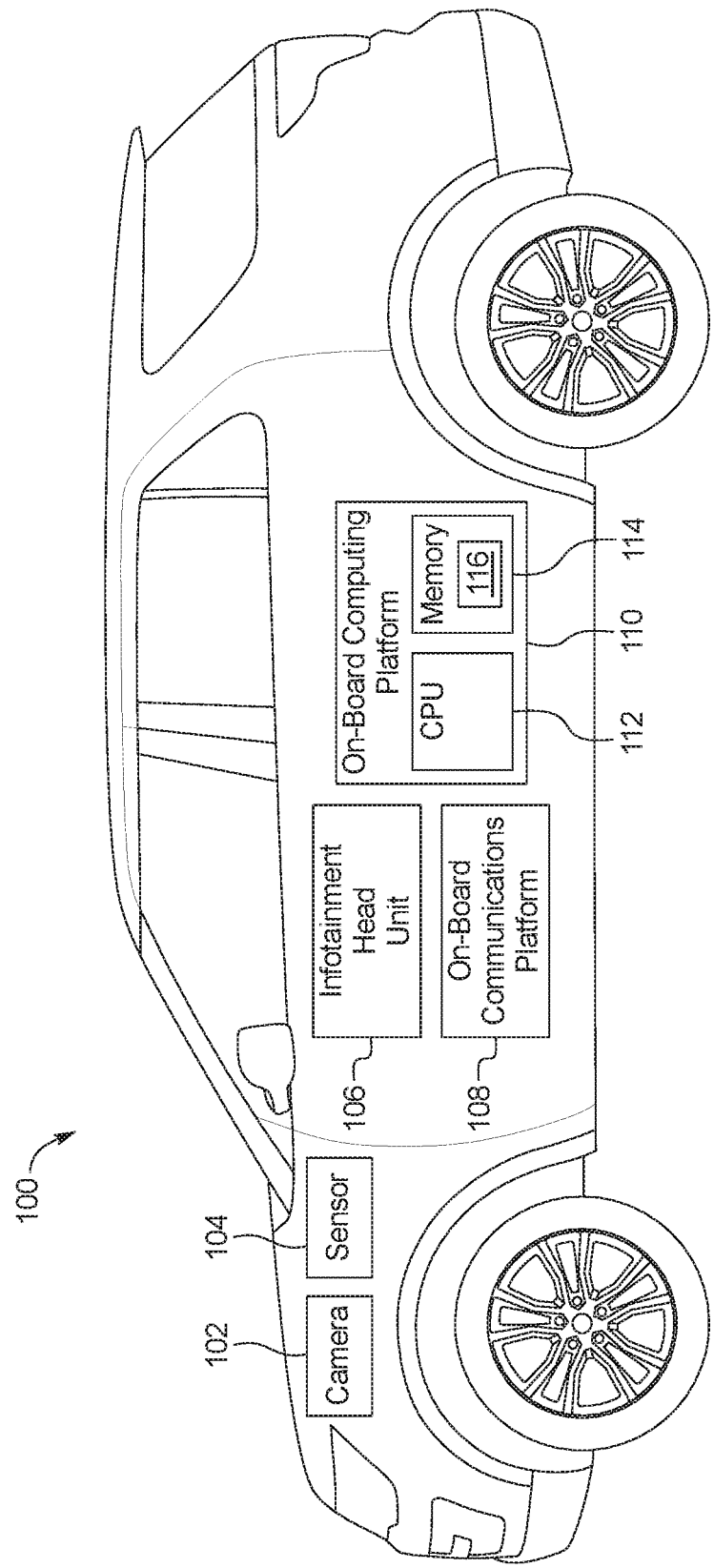
FIG. 1 illustrates a vehicle in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles include a feature for autonomously parking a vehicle into an unoccupied parking spot. When such a feature is initiated, the vehicle determines: (1) its environment; (2) an unoccupied parking spot based on the detected environment; and (3) one or more parking maneuvers for moving into the unoccupied parking spot. To determine the one or more parking maneuvers, boundaries for executing the one or more parking maneuvers must be determined.

An example vehicle disclosed herein generates a variable virtual boundary for determining one or more parking maneuvers for moving the vehicle to an unoccupied parking spot. The variable virtual boundary is a boundary at which the vehicle is allowed to maneuver with respect to the unoccupied parking spot in order for the vehicle to move into the unoccupied parking spot. For example, the variable virtual boundary may be defined by another vehicle, a pavement marking, a wall, a parking curb, a sidewalk, a waterway, pedestrian areas, steep inclines/declines, a pasture, etc. Based on the variable virtual boundary, the vehicle determines a maneuvering space at which the vehicle is able to execute the one or more parking maneuvers.

Turning to the figures, FIG. 1 illustrates an example vehicle 100 in accordance with the teachings herein.

The vehicle 100 may be a standard gasoline powered vehicle, a hybrid vehicle, an electric vehicle, a fuel cell vehicle, and/or any other mobility implement type of vehicle. The vehicle includes parts related to mobility, such as a powertrain with an engine, a transmission, a suspension, a driveshaft, and/or wheels, etc. The vehicle 100 may be semi-autonomous (e.g., some routine motive functions controlled by the vehicle) or autonomous (e.g., motive functions are controlled by the vehicle without direct driver input). The vehicle 100 includes a camera 102, a sensor 104, an infotainment head unit 106, an on-board communications platform 108, and an on-board computing platform 110. One or more of these elements may be communicatively coupled to each other wirelessly or via one or more communication bus (not illustrated).

The camera 102 is disposed on the exterior of the vehicle 100. The camera 102 may be a front-facing camera, a rear-facing camera, a side-facing camera, and/or a 360 degree camera. In some examples, the vehicle 100 may include more than one camera 102 disposed on the exterior of the vehicle 100.

The sensor 104 is also disposed on the exterior of the vehicle 100. The sensor 104 may be a lidar sensor, a radar sensor, an ultrasonic sensor, and/or any other sensor capable of detecting an object and determining a range between said sensor and the object. In some examples, the vehicle 100 may include more than one sensor 104. In some examples, the vehicle 100 may further include a magnetometer (not illustrated) for measuring a magnetic orientation of the vehicle and/or a direction at which the vehicle is moving.

The infotainment head unit 106 provides an interface between the vehicle 100 and a user. The infotainment head unit 106 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 106 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 106 displays the infotainment system on, for example, the center console display (not illustrated).

The on-board communications platform 108 includes wired or wireless network interfaces to enable communication with external networks. The on-board communications platform 108 also includes hardware (e.g., processors, memory, storage, antenna, etc.) and software to control the wired or wireless network interfaces. In the illustrated example, the on-board communications platform 108 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m); Near Field Communication (NFC), local area wireless network (including IEEE 802.11 a/b/g/n/ac or others), Wireless Gigabit (IEEE 802.11ad), etc.). In some examples, the on-board communications platform 108 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols. In some examples, the on-board communications platform communicates with (e.g., transmits signal to, receives signals from) a global positioning system (GPS) to monitor a location of the vehicle.

The on-board computing platform 110 includes at least one processor 1112 and memory 114. The processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 116 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The memory 114 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 114, the computer readable medium, and/or within the processor during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The memory 114 embodies a park assist controller 116. The memory 114 is operable with the processor to execute functions of the park assist controller 116.

The park assist controller 116 performs operations related to autonomous or semi-autonomous vehicle park assist. The park assist controller 116 can be implemented in a full-active park-assist system in which braking, accelerating, and steering are autonomously operated and/or in a semi-active park-assist system in which steering is autonomously operated and accelerating and braking are user operated.

When a user initiates the vehicle park assist feature via the infotainment head unit 106 or a mobile device communicatively coupled to the on-board communications platform 108, the park assist controller 116 enters a detection mode. The detection mode is a mode at which the vehicle identifies at least one unoccupied parking spot. During the detection mode, the park assist controller 116 may instruct the user, via the infotainment head unit 106 or the mobile device, to maneuver the vehicle along a detection path so as to detect an unoccupied parking spot. In some example, the park assist controller 116 may autonomously maneuver the vehicle along a detection path so as to detect an unoccupied parking spot. While the vehicle is traversing the detection path, the camera 102 and/or the sensor 104 continuously detects for one or more objects proximate to the detection path. For example, one or more objects may be other vehicles, pavement markings, walls, a parking curb, a border between a drivable terrain and one or more elements (e.g., a sidewalk, a waterway, pedestrian areas, steep inclines/declines, a pasture, etc.), etc. In some examples, the park assist controller 116 obtains, via the on-board communications platform, GPS data, traffic data, map data from one or more external servers. In such examples, the park assist controller 116 uses such data as context information for identifying the one or more detected objects. For example, the park assist controller 116 may use GPS data to determine that the vehicle is positioned in a parking lot, and use such data as context to identify the one or more detected objects as parked vehicles.

For each detected object, the park assist controller 116 identifies at least one edge of each detected object. Based on one or more edges of one or more detected objects, the park assist controller 116 identifies an unoccupied parking spot. For example, the park assist controller 116 may identify an unoccupied parking spot when a space between one detected object and another detected object is equal to or greater than a threshold. The threshold may account for the dimension of the vehicle, spaces required for opening doors of the vehicle, spaces required for entering/exiting the parking spot, etc.

Further, the park assist controller 116 defines a variable virtual boundary based on the location of the unoccupied parking spot and/or one or more edges of one or more detected objects. For example, the variable virtual boundary may be defined by: (1) one or more edges of one or more detected objects on a side of the detection path excluding the unoccupied parking spot; and (2) one of the detected objects that is the closest to the unoccupied parking spot in a direction that is perpendicular to a direction at which the vehicle 100 is facing when the vehicle 100 finishes traversing the detection path. In such example, the unoccupied parking spot is a target parking position selected by the user or automatically selected by the park assist controller 116, as opposed to other unoccupied parking spot that may have been detected while the vehicle 100 was traversing the detection path. In some examples, the variable virtual boundary is predetermined. For example, the user may set the distance between the unoccupied parking spot and the variable virtual boundary, or the park assist controller 116 may arbitrarily set the distance between the unoccupied parking spot and the variable virtual boundary. In some examples, the park assist controller 116 automatically adjusts the variable virtual boundary when the vehicle is manually maneuvered to cross the variable virtual boundary.

The park assist controller 116 generates a maneuver area. The maneuver area is an area in which one or more parking maneuvers may be executed. A parking maneuver refers to a single, continuous movement of the vehicle without changing gears to alter directions. A number of parking maneuvers, a length of each parking maneuver, and a rate of change of angle for each parking maneuver vary with respect to the dimension of the maneuver area. The maneuver area is variable with respect to one or more edges of one or more detected objects, the variable virtual boundary, and/or a range at which the camera and/or the sensor can measure during the detection mode. In some examples, the maneuver area is variable based on whether one or more detected objects is a traversable object. The traversable object is an object that is identified as being traversable by the vehicle for the purpose of moving the vehicle to an unoccupied parking spot. For example, the traversable object may include a pavement marking, a border between a road and a drivable terrain (e.g., a side road, dirt, grass), etc.

Based on the maneuver area, the park assist controller 116 generates at least one parking maneuver for moving the vehicle to the selected unoccupied parking spot. In some examples, the park assist controller 116 may generate the at least one parking maneuver by prioritizing a minimum amount of time required for moving the vehicle to the unoccupied parking spot. In some examples, the park assist controller 116 may generate the at least one parking maneuver by prioritizing a minimum amount of maneuvers required for moving the vehicle to the unoccupied parking spot.

The park assist controller 116 executes the at least one parking maneuver in response to a user input. For example, the user input may be an input via the infotainment head unit 106 or a gear change to reverse.

Figure 2:
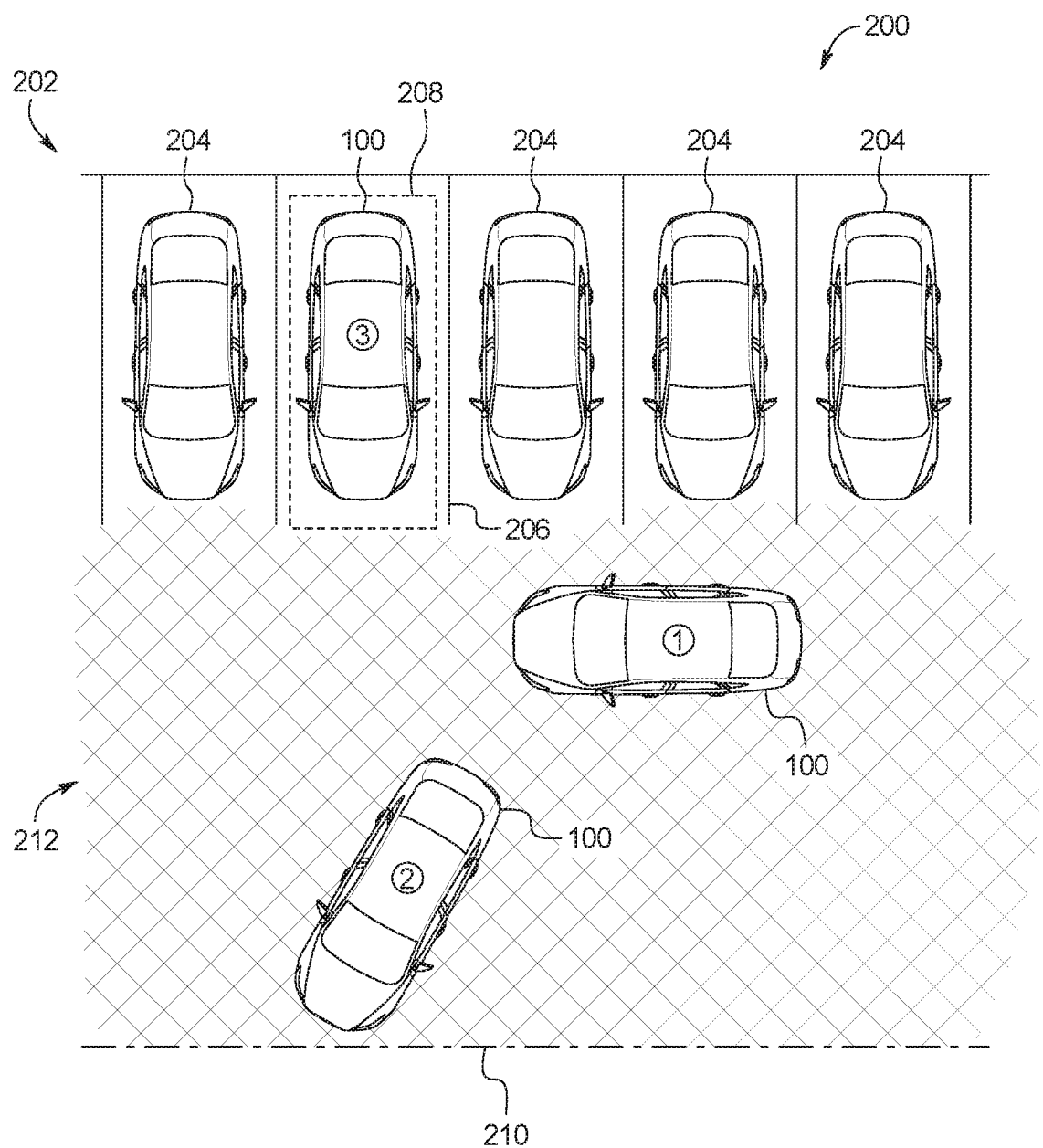
FIG. 2. illustrates a plan view of a first example scenario including the vehicle of FIG. 1.

FIG. 2. illustrates a plan view of a first example scenario including the vehicle 100 of FIG. 1. In the illustrated example, the vehicle 100 is positioned in a parking lot 202. The right side of the vehicle 100 at position (1) includes parked vehicles 204 and a parking lane pavement marking 206, and the left side of the vehicle at position (1) is generally open and free of any objects detectable by the vehicle 100. In the illustrated example, position (1) of the vehicle 100 indicates a position of the vehicle 100 at the end of the detection mode. At position (1), the vehicle 100 has: (1) identified the edges of the parked vehicles 204 and the parking lane pavement marking 206; (2) determined an unoccupied parking spot 208 based on the edges; (3) determined a variable virtual boundary 210 based on the position of the unoccupied parking spot; (4) and a maneuver area 212 based on the edges, the virtual boundary 210, and a range at which the camera 102 and/or the sensor 104 can measure during the detection mode. In the illustrated example, the variable virtual boundary is separated from the unoccupied parking spot by a predetermined distance. The predetermined distance may be user-selected. Based on the maneuver area, the park assist controller 116 generates a parking maneuver from position (1) to (2) and a parking maneuver from position (2) to (3).

Figure 3A:
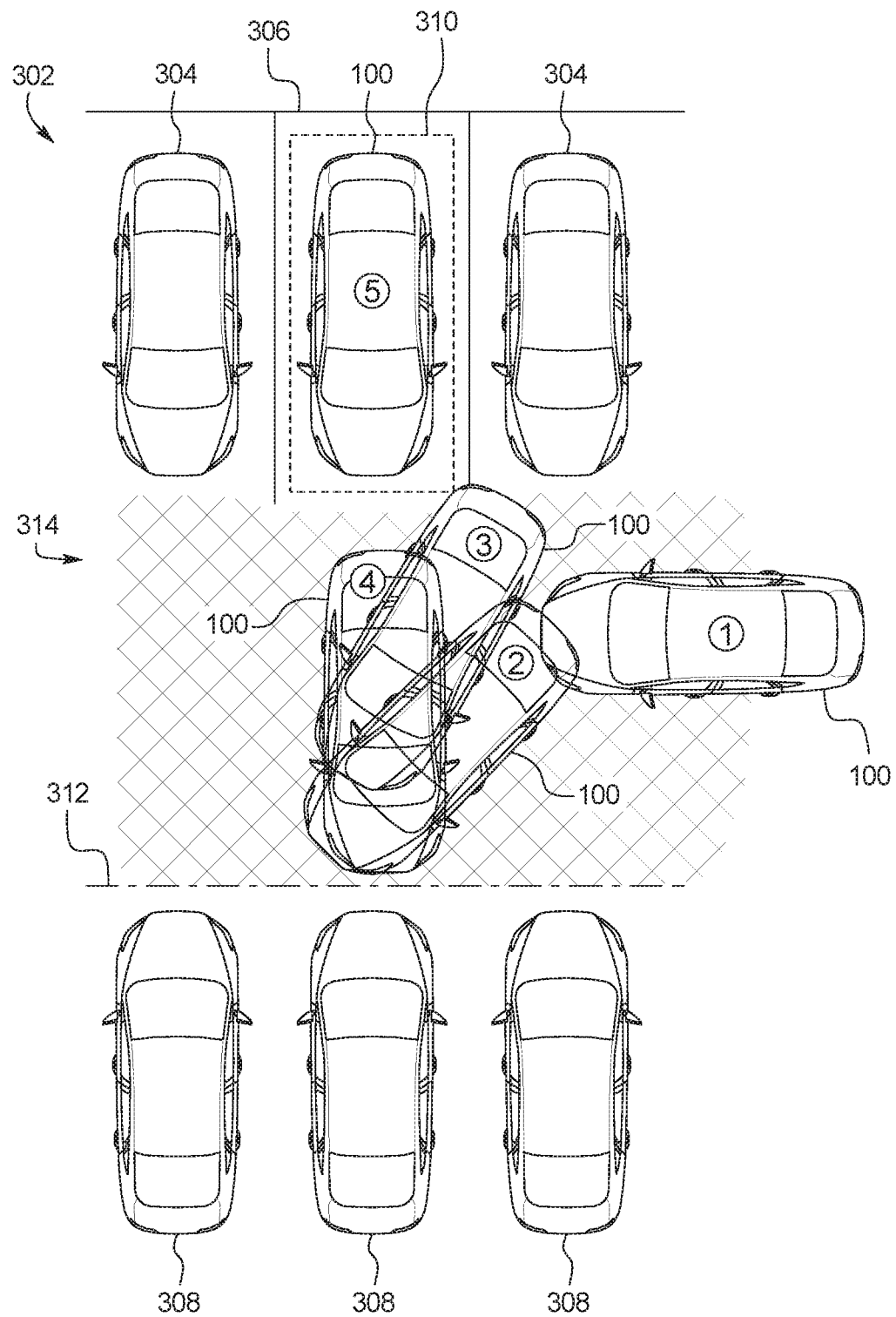
FIGS. 3A and 3B illustrate a plan view of a second example scenario including the vehicle of FIG. 1.

FIG. 3A illustrates a plan view of a second example scenario including the vehicle 100 of FIG. 1. In the illustrated example, the vehicle 100 is positioned in a parking lot 302. The right side of the vehicle 100 at position (1) includes first parked vehicles 304 and a parking lane pavement marking 306, and the left side of the vehicle 100 at position (1) includes second parked vehicles 308. In the illustrated example, position (1) of the vehicle 100 indicates a position of the vehicle 100 at the end of the detection mode. At position (1), the vehicle has: (1) identified the edges of the first parked vehicles 304, the parking lane pavement marking 306, and the second parked vehicles 308; (2) determined an unoccupied parking spot 310 based on the edges of the first parked vehicles 304 and the parking lane pavement marking 306; (3) determined a variable virtual boundary 312 based on the position of the unoccupied parking spot 310 and the edges of the second parked vehicles 308; (4) and a maneuver area 314 based on the edges, the virtual boundary 312, and a range at which the camera 102 and/or the sensor 104 can measure during the detection mode. In the illustrated example, the variable virtual boundary 312 is proximate to the edges of the second parked vehicles 308. Based on the maneuver area 314, the park assist controller 116 generates parking maneuvers from positions (1) to (2), (2) to (3), (3) to (4), and (4) to (5).

Figure 3B:
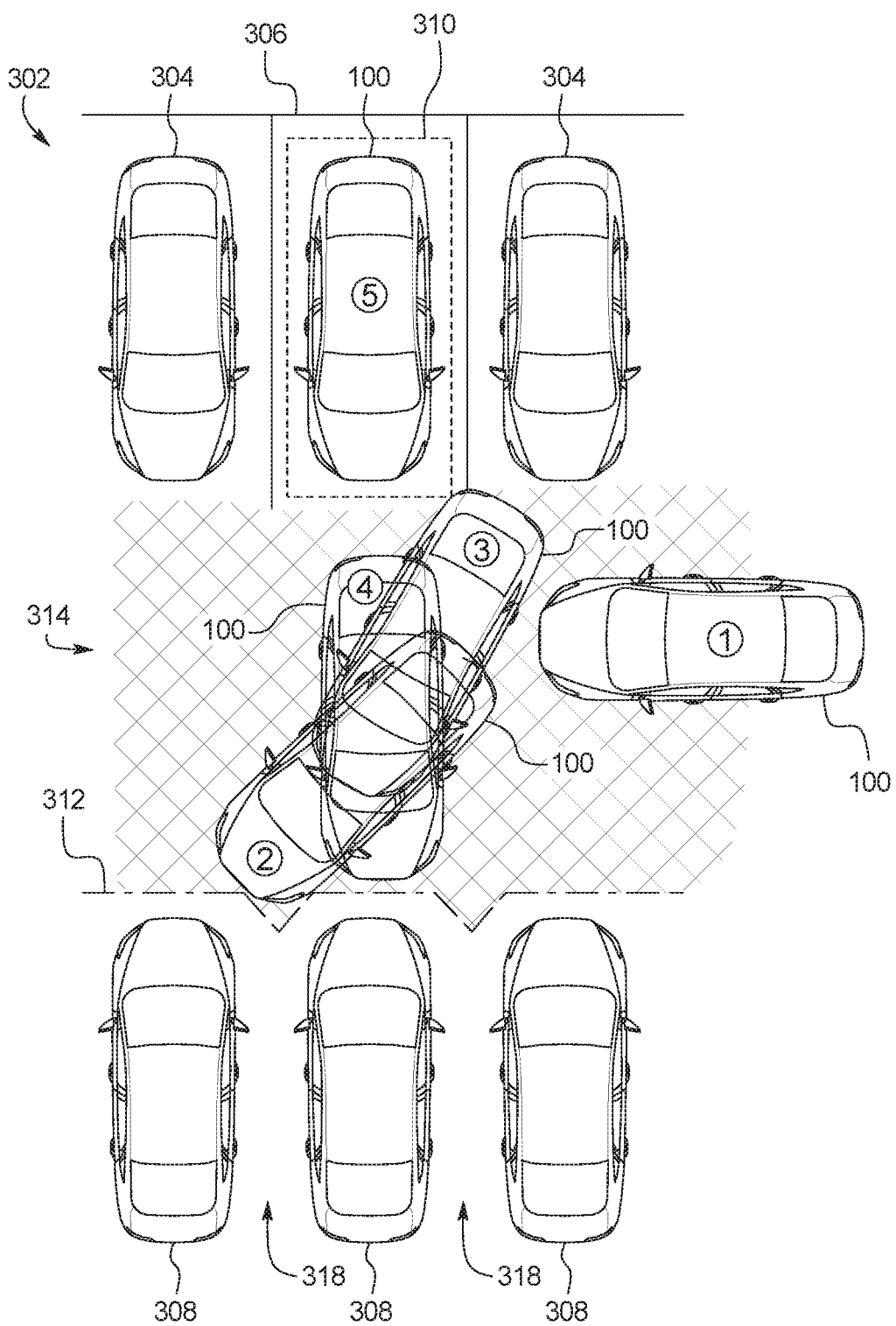

In some examples, the park assist controller 116 sets the variable virtual boundary to be non-linear such that a larger maneuver area is generated. For example, FIG. 3B illustrates the plan view of the second example scenario including the vehicle of FIG. 1, where the park assist controller 116 accounts for spaces 318 between the second parked vehicles 308 to determine the variable virtual boundary 312. Thus, when the maneuver area 314 is generated based on the variable virtual boundary 312, the maneuver area 314 includes at least a portion of the spaces 318 between the second parked vehicles 308.

Figure 4:
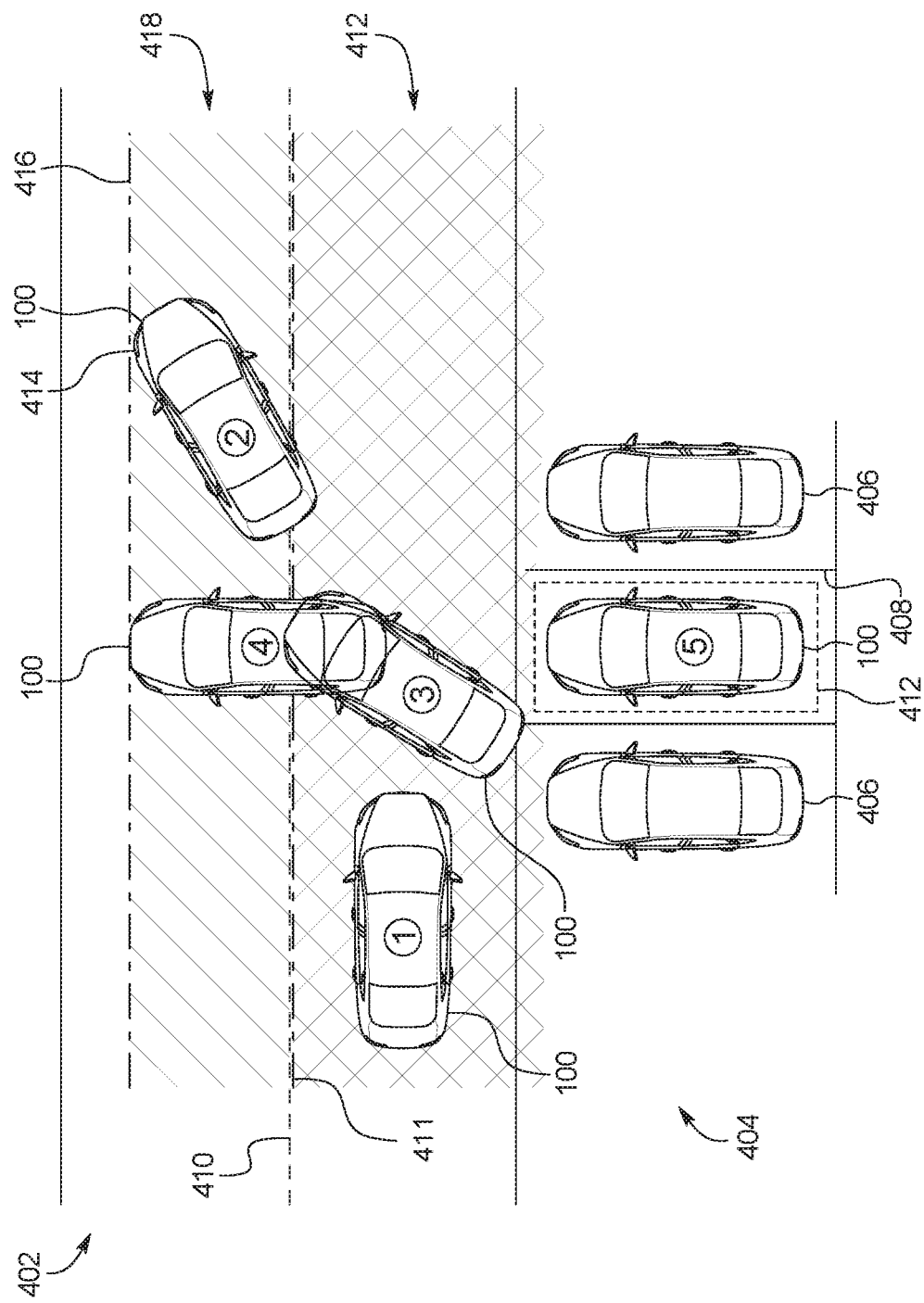
FIG. 4 illustrates a plan view a third example scenario including the vehicle of FIG. 1.

FIG. 4. illustrates a plan view of a third example scenario including the vehicle 100 of FIG. 1. In the illustrated example, the vehicle 100 is positioned in a road 402 and by a plurality of perpendicular parking spots 404. The right side of the vehicle 100 at position (1) includes parked vehicles 406 and a parking lane pavement marking 408, and the left side of the vehicle 100 at position (1) includes traffic lane pavement marking 410. In the illustrated example, position (1) of the vehicle 100 indicates a position of the vehicle 100 at the end of the detection mode. At position (1), the vehicle 100 has: (1) identified the edges of the parked vehicles 406, the parking lane pavement marking 408, and the traffic lane pavement marking 410; (2) determined an unoccupied parking spot 412 based on the edges of the parked vehicles 406 and the parking lane pavement marking 408; (3) determined a variable virtual boundary 411 based on the position of the unoccupied parking spot 412 and the edges of the traffic lane pavement marking 410; (4) and a maneuver area based on the edges, the virtual boundary 410, and a range at which the camera 102 and/or the sensor 104 can measure during the detection mode. In the illustrated example, from position (1) to (2), a driver of the vehicle 100 manually maneuvers the vehicle 100 to cross the virtual boundary 410. In response, the park assist controller 116 automatically adjusts the variable virtual boundary 410 to the furthest edge 414 of the vehicle 100 crossing the variable virtual boundary 410. Based on the adjusted variable boundary 416, park assist controller 116 adjusts the maneuver area 412. Based on the adjusted maneuver area 418, the park assist controller 116 generates parking maneuvers from positions (2) to (3), (3) to (4), and (4) to (5).

Figure 5:
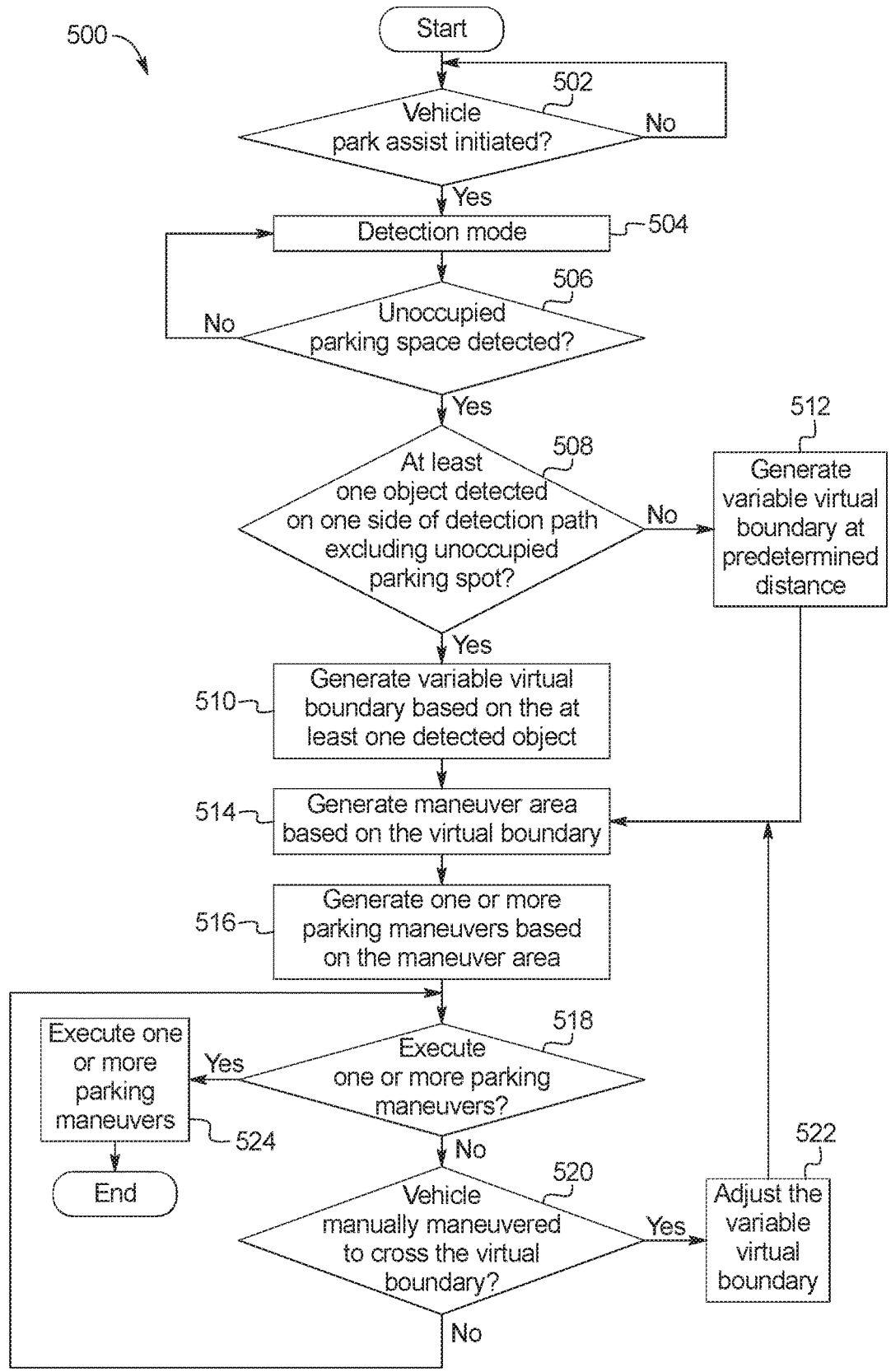
FIG. 5 illustrates a flowchart of a method for operating a park assist controller of the vehicle of FIG. 1.

FIG. 5 illustrates a flowchart of a method for operating the park assist controller 116 of the vehicle 100 of FIG. 1.

At block 502, the park assist controller 116 determines whether a user wishes to imitate a vehicle park assist feature. If so, the method continues to block 504. Otherwise, the method returns to block 502.

At block 504, the park assist controller 116 enters a detection mode. During the detection mode, the vehicle 100 travels along a detection path, and the park assist controller 116 detects, via the camera 102 and/or the sensor 104, one or more objects within or proximate to the detection path.

At block 506, the park assist controller 116 determines whether there is an unoccupied parking space based on one or more edges of one or more detected objects. If so, the method continues to block 508. Otherwise, the method returns to block 504.

At block 508, the park assist controller 116 determines whether there is at least one object detected on one side of the detection path excluding the unoccupied parking spot. If so, the method continues to block 510. Otherwise, the method continues to block 512.

At block 510, the park assist controller 116 generates a variable virtual boundary based on the at least one detected object.

At block 512, the park assist controller 116 generates the variable virtual boundary such that the variable virtual boundary is separated from the unoccupied parking spot at a predetermined distance.

At block 514, the park assist controller 116 generates a maneuver area based on the variable virtual boundary.

At block 516, the park assist controller 116 generates one or more parking maneuvers based on the maneuver area.

At block 518, the park assist controller 116 determines whether the user wishes to execute the one or more parking maneuvers. If so, the method continues to block 520. Otherwise, the method continues to block 524.

At block 520, the park assist controller 116 determines whether the vehicle 100 is manually maneuvered to cross the variable virtual boundary. If so, the method continues to block 522. Otherwise, the method returns to block 518.

At block 522, the park assist controller 116 adjusts the variable virtual boundary to the furthest edge of the vehicle 100 crossing the variable virtual boundary.

At block 524, the park assist controller 116 execute the one or more parking maneuvers.

Although the example steps are described with reference to the flowchart illustrated in FIG. 5, many other methods of implementing the park assist controller 116 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising: a camera; a sensor; and processors configured to: detect an unoccupied parking spot while the vehicle traverses a detection path; define a variable virtual boundary based on at least one object detected on a side of the detection path excluding the unoccupied parking spot; generate at least one parking maneuver based on the unoccupied parking spot and the variable virtual boundary, wherein the processors automatically move the vehicle to the unoccupied parking spot; and responsive to the vehicle crossing the variable virtual boundary: adjust the variable virtual boundary to the farthest edge of the vehicle crossing the variable virtual boundary, wherein adjusting the variable virtual boundary to the farthest edge of the vehicle crossing the variable virtual boundary comprises extending the variable virtual boundary parallel to the previously defined variable virtual boundary by a maximum perpendicular distance that a vehicle edge extends from the previously defined variable virtual boundary.

2. The vehicle of claim 1, wherein the processors are further configured to:

generate at least one different parking maneuver based on the unoccupied parking spot and the adjusted variable virtual boundary.

3. The vehicle of claim 1, wherein the at least one object is a traffic lane pavement marking.

4. The vehicle of claim 1, wherein the at least one object is a border between two terrains, wherein at least one of the two terrains is a road.

5. The vehicle of claim 1, wherein the processors are further configured to:
generate a maneuvering area based on the unoccupied parking spot, the variable virtual boundary, and areas measured by the camera and the sensor while the vehicle traverses the detection path.

6. The vehicle of claim 5, the processors further configured to: responsive to detecting two objects on the side of the detection path: responsive to detecting a space between the two objects, define the variable virtual boundary based on the two objects such that the maneuvering area includes at least a portion of the space.

7. The vehicle of claim 5, wherein the processors are further configured to: generate a different maneuvering area based at least in part on the adjusted variable virtual boundary; and generate at least one different parking maneuver based on the different maneuvering area.

8. The vehicle of claim 1, wherein the processors are configured to:
receive global positioning system (GPS) data;
detect the unoccupied parking spot and the at least one object based at least in part of the GPS data.

9. A vehicle comprising: a camera; a sensor; and processors configured to: detect an unoccupied parking spot while the vehicle traverses a detection path; define a variable virtual boundary on a side of the detection path excluding the unoccupied parking spot; and generate at least one parking maneuver based on the unoccupied parking spot and the variable virtual boundary, wherein the processors automatically move the vehicle to the unoccupied parking spot; generate a maneuvering area based on the unoccupied parking spot, the variable virtual boundary, and areas measured by the camera and the sensor while the vehicle traverses the detection path; responsive to the vehicle crossing the variable virtual boundary: adjust the variable virtual boundary to the farthest edge of the vehicle crossing the variable virtual boundary; generate a different maneuvering area based at least in part on the adjusted variable virtual boundary; and generate at least one different parking maneuver based on the different maneuvering area.

10. The vehicle of claim 9, wherein the variable virtual boundary is positioned at a predetermined distance away from the unoccupied parking spot, and wherein the predetermined distance is user-selected.

11. A method of autonomously parking a vehicle, comprising: detecting, by at least one processor of the vehicle, via at least one camera and sensor, an unoccupied parking spot while the vehicle traverses a detection path; defining, by the at least one processor, a variable virtual boundary based on at least one object detected on a side of the detection path excluding the unoccupied parking spot; and generating, by the at least one processor, at least one parking maneuver based on the unoccupied parking spot and the variable virtual boundary, wherein the at least one processor automatically moves the vehicle to the unoccupied parking spot; and responsive to the vehicle crossing the variable virtual boundary: adjusting, by the at least one processor, the variable virtual boundary to the farthest edge of the vehicle crossing the variable virtual boundary, wherein adjusting the variable virtual boundary to the farthest edge of the vehicle crossing the variable virtual boundary comprises extending the variable virtual boundary parallel to the previously defined variable virtual boundary by a maximum perpendicular distance that a vehicle edge extends from the previously defined variable virtual boundary.

12. The method of claim 11, further comprising:
generating, by the at least one processor, at least one different parking maneuver based on the unoccupied parking spot and the adjusted variable virtual boundary.

13. The method of claim 11, wherein the at least one object is a traffic lane pavement marking.

14. The method of claim 11, wherein the at least one object is a border between two terrains, wherein at least one of the two terrains is a road.

15. The method of claim 11, further comprising:
generating, by the at least one processor, a maneuvering area based on the unoccupied parking spot, the variable virtual boundary, and areas measured by the at least one camera and sensor while the vehicle traverses the detection path.

16. The vehicle of claim 15, further comprising: responsive to detecting two objects on the side of the detection path: responsive to detecting a space between the two objects, defining, by the at least one processor, the variable virtual boundary based on the two objects such that the maneuvering area includes at least a portion of the space.

17. The vehicle of claim 15, further comprising: generating, by the at least one processor, a different maneuvering area based at least in part on the adjusted variable virtual boundary; and generating, by the at least one processor, at least one different parking maneuver based on the different maneuvering area.

18. The method of claim 11, further comprising:
receiving, by the at least one processor, global positioning system (GPS) data; and
detecting, by the at least one processor, the unoccupied parking spot and the at least one object based at least in part of the GPS data.

19. A method of autonomously parking a vehicle, comprising: detecting, by at least one processor of the vehicle, via at least one camera and sensor, an unoccupied parking spot while the vehicle traverses a detection path; defining, by the at least one processor, a variable virtual boundary based on at least one object detected on a side of the detection path excluding the unoccupied parking spot; generating, by the at least one processor, at least one parking maneuver based on the unoccupied parking spot and the variable virtual boundary, wherein the at least one processor automatically moves the vehicle to the unoccupied parking spot; generating, by the at least one processor, a maneuvering area based on the unoccupied parking spot, the variable virtual boundary, and areas measured by the at least one camera and sensor while the vehicle traverses the detection path; responsive to the vehicle crossing the variable virtual boundary: adjusting, by the at least one processor, the variable virtual boundary to the farthest edge of the vehicle crossing the variable virtual boundary; generating, by the at least one processor, a different maneuvering area based at least in part on the adjusted variable virtual boundary; and generating, by the at least one processor, at least one different parking maneuver based on the different maneuvering area.

* * * * *